United States Patent [19]

Rekers et al.

[11] Patent Number: 4,593,079

[45] Date of Patent: Jun. 3, 1986

[54] RESIN RHEOLOGY CONTROL PROCESS AND CATALYST THEREFOR

[75] Inventors: Louis J. Rekers, Wyoming; Stanley J. Katzen, Cincinnati, both of Ohio

[73] Assignee: National Distillers and Chemical Corporation, New York, N.Y.

[21] Appl. No.: 383,650

[22] Filed: Jun. 1, 1982

Related U.S. Application Data

[63] Continuation of Ser. No. 217,483, Dec. 17, 1980, abandoned, which is a continuation of Ser. No. 957,601, Nov. 3, 1978, abandoned, which is a continuation-in-part of Ser. No. 800,586, May 25, 1977, abandoned.

[51] Int. Cl.$^4$ ................................................ C08F 4/24
[52] U.S. Cl. ..................................... 526/100; 526/105; 526/106; 526/129; 526/130
[58] Field of Search ................... 264/331.17; 526/100, 526/105, 106, 352

[56] References Cited

U.S. PATENT DOCUMENTS

| | | | |
|---|---|---|---|
| 3,288,767 | 11/1966 | Hogan et al. | 526/106 |
| 3,378,540 | 4/1968 | Witt | 526/106 |
| 3,639,378 | 2/1972 | Long | 526/105 |
| 3,984,351 | 10/1976 | Rekers et al. | 526/130 |
| 3,985,676 | 10/1976 | Rekers et al. | 526/124 |
| 4,049,896 | 9/1977 | Rekers et al. | 526/105 |
| 4,100,104 | 7/1978 | Katzen et al. | 526/129 |

FOREIGN PATENT DOCUMENTS 1312650 4/1973 United Kingdom.

*Primary Examiner*—Paul R. Michl
*Attorney, Agent, or Firm*—Kenneth D. Tremain

[57] ABSTRACT

Process for selective production of polyolefin resins of controlled rheology responsive to catalyst morphology in heat activated aluminum treated porous supports e.g., silica gel of regulated moisture content.

2 Claims, 1 Drawing Figure

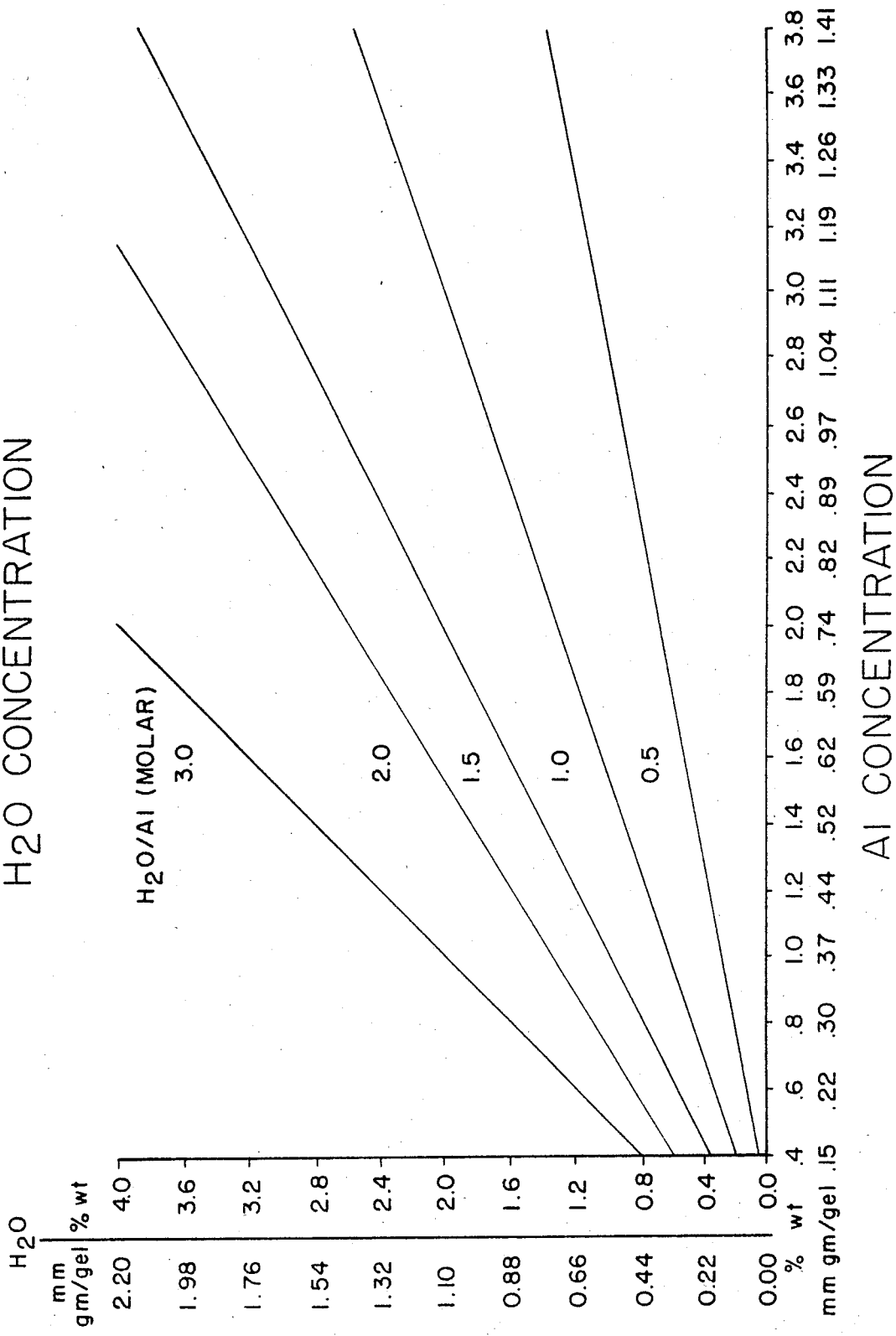

4,593,079

RESIN RHEOLOGY CONTROL PROCESS AND CATALYST THEREFOR

This is a continuation of application Ser. No. 217,483, filed 12-17-80 abandoned which is a continuation of Ser. No. 957,601 filed 11-3-78, abandoned, which is a continuation-in-part application of U.S. Ser. No. 800,586 filed May 25, 1977, abandoned.

FIELD OF THE INVENTION

This invention relates to the production of specialized polyolefin resins, especially single reactor blow molding resins and, more particularly, to a catalytic method for selectively preparing polyethylene resins of controlled characteristics e.g., distinct melt rheology.

BACKGROUND OF THE INVENTION

Molded articles, and particularly blow molded structures such as bottles are commonly formed from polymers of 1-olefins such as polyethylene. It is important to the commercial utilization of a given polymer system that the converted product such as a bottle exhibit an optimized balance of properties, including for example, acceptable stress crack resistance and flexural stiffness. In addition, and in a contributing sense, it is necessary that the polymer exhibit suitable processability, i.e., satisfactory rheological behavior under flow and deformation during fabrication. Although the viscoelastic behavior of polymer melts has been the subject of considerable study, it has not proven possible to translate performances during fabrication to end use articles in such manner as to selectively determine polymerization and particularly catalyst requirements. Moreover, as in any case catalyst performance must also be measured in terms of efficiency or productivity and stability over a sensible life.

The use of chromium compounds in the polymerization of olefins is well-known. U.S. Pat. Nos. 2,825,721 and 2,951,816 teach the use of $CrO_3$ supported on an inorganic material such as silica, alumina or combinations of silica and alumina and activated by heating at elevated temperatures to polymerize olefins. When these catalyst systems are used in various polymerization processes such as the well-known particle-form process, the resins produced, while useful in many applications, are unsatisfactory for others because of a deficiency in certain properties such as melt index.

Improved chromium based supported catalysts are known, particularly those disclosed and claimed in U.S. Pat. Nos. 3,984,351 and 3,985,676. Such catalysts permit the production of resins of improved flow properties and shear response, but have been found difficult to employ on a commercial scale without product segregation or resin blending because of variation in rheological properties of polymer produced, relative to its use in fabrication and especially blow molding e.g. in accumulator, or accumulator ram equipment.

An examination of this phenomenon utilizing now classic measures of resin shear response (HLMI/MI values determined according to ASTM-D-1238, Conditions F/E) evidenced no apparent reason for differential performance of these resins in fabrication equipment. Empirical studies suggested that a more exacting viscosity analysis was required to isolate resin candidates adapted to afford shortened cycle times or otherwise improved performance in selected blow molding equipment. It has been found that such a determination may be made using a viscosity ratio of $Eta_1/Eta_{1000}$, broadening the range covered and expressly including the range 1 to 1000 reciprocal seconds. These values provide a correlatable measure of critical performance in end use as more fully described hereinafter, and permit the selection of resin candidates particularly adapted to use in such blow molding equipment as the accumulator or accumulator ram equipment aforementioned.

Further studies of certain chromium catalysed resin variability in terms of this viscosity ratio characteristic permitted identification of production factors critical of the controlled production of resins of the desired characteristics.

Manyik et al., in U.S. Pat. Nos. 3,231,550 and 3,242,099 describe poly(hydrocarbylaluminum oxides) produced by the reaction of water with an organo hydrocarbylaluminum compound, which are in turn reacted with transition metal e.g., chromium compounds and used as olefin polymerization catalysts.

Shida et al. in U.S. Pat. No. 3,882,096 disclose ethylene catalysts comprising a support impregnated with chromium oxide and the reaction product of water and an alkyl ester of titanium, and heat activated.

Long in U.S. Pat. No. 3,152,105 shows an $\alpha$-olefin catalyst comprising a carboxylic acid salt of chromium, water and an organoaluminum compound.

Hogan et al. in U.S. Pat. No. 3,288,767 disclose a process for the control of shear response in the preparation of polyolefins, by varying the water vapor content of the catalyst activation art.

Witt in U.S. Pat. No. 3,378,540 produces 1-olefin polymers of controlled melt index by utilizing a catalyst system formed from a hydrogel support of controlled water content.

Modifications in silica gel for catalytic activity are shown in Burwell, Chemtech, pp. 370–377 (1974) and Peri, J. Cat. 41, pp. 227–239 (1976). None of these prior art disclosures refer to the control of resin rheological characteristics in a process for the polymerization of 1-olefins utilizing a support, heat activated chromium catalyst.

BRIEF DESCRIPTION OF THE INVENTION

It has been discovered that level and type of aluminum values deposited upon a supported catalyst critically controls its characteristics, and may be employed in a chromium catalyst system as a direct means to achieve selective resin production in a controlled 1-olefin polymerization. The same effects can be achieved indirectly by establishing and maintaining a fixed ratio of water to aluminum compound during catalyst preparation.

Briefly, the invention reflects the discovery that resin property variations may be traced to system water, or moisture level present in the course of catalyst preparation. Silica gel and other inorganic catalyst supports are known to be active adsorbents, and readily pick up significant quantities of water. (Dried silica gel with less than 0.5% water content, simply poured through 12 inches of 80° F. air at 50% RH will reach a moisture content of 2%). Their exposure to a humid atmosphere is accordingly conventionally controlled in handling, and the level of adsorbed water is ordinarily within such low limits i.e., a few percent by weight as not to constitute a noticeable element in the system. However, such handling procedures as have customarily been employed permit considerable variation within the range.

In the course of preparation of resins for general use, such moisture variation in the catalyst preparation system shows no meaningful differentiation in resin performance. However, it has now been found that heretofore undiscerned differences in resin rheological properties can become important to efficiency in certain critical end uses such as the blow molding of bottles utilizing accumulator ram equipment. Surprisingly, it has been discovered that such resin variations are traceable to and may be controlled by moisture level in the catalyst preparation system.

While not wishing to be bound by an essentially hypothetical elucidation, it is presently believed that the selective performance of the novel catalyst systems hereof may be attributed to the morphology, or stereoconfiguration of the activated catalyst surface relative to the aluminum species formed in situ by controlled hydrolysis. That is, a series of compositional modifications are believed to result from the hydrolysis reactions with residual moisture in the system, which modifications range through varying steric configurations of the aluminum-containing moieties, and appear individually to permanently and selectively control polymerization performance upon heat activation. Thus, a range of resin properties may be selectively and controllably produced responsive to control of water and aluminum levels employed in catalyst preparation.

In accordance with this invention there is produced a catalyst comprising an inorganic oxide support maintained under controlled moisture condition. The aluminum treated supports may be activated by heating in a non-reducing e.g., oxygen-containing atmosphere at a temperature above about 200° F. up to the decomposition temperature of the support material, and utilized directly as a hydrogenation or cracking catalyst e.g., in the isomerization of hexane, with excellent activity, selectivity, stability and attrition resistance. Thus, such materials may be used as supports with other catalytic promoters in a variety of catalysed reactions or employed directly for isomerization, reforming, cracking, polymerization, alkylation, dealkylation, hydrogenation, dehydrogenation or hydrocracking reactions.

Preferably, the support is coated with an aluminum compound and also treated with a catalytic element being a compound of a metal selected from the group consisting of chromium, cobalt, nickel, vanadium, molybdenum and tungsten, or admixtures thereof, ordinarily as the oxides, and most preferably a chromium containing compound, especially a chromium oxide, or the organophosphoryl chromium reaction product of U.S. Pat. No. 3,985,676 aforementioned.

In the most preferred embodiment of the present invention an organophosphoryl chromium reaction product is deposited upon a high surface area silica gel of controlled water level with an aluminum compound reactive with water, and the catalyst intermediate so produced is heat activated for use.

Olefin polymerization may accordingly be conducted in such manner as to minimize resin property variation and hence the necessity for blending or batch selection by controlling catalyst characteristics as aforesaid i.e., utilizing in the polymerizations catalyst prepared under essentially invariant moisture conditions in the support. Resin so produced under otherwise equivalent conditions from run-to-run may then be directly employed e.g., in blow-molding operations by reason of its low variability in critical properties.

DETAILED DESCRIPTION OF THE INVENTION

The inorganic support materials useful in the present invention include those normally employed in supported chromium catalysts used in olefin polymerizations such as those discussed in U.S. Pat. No. 2,825,721. Typically, these support materials are inorganic oxides of silica, alumina, silica-alumina mixtures, thoria, zirconia and comparable oxides which are porous, have a medium surface area, and have surface hydroxyl groups. Preferred support materials are silica xerogels or xerogels containing silica as the major constituent. Especially preferred are the silica xerogels described in U.S. Pat. No. 3,652,214-6 which silica xerogels have a surface area in the range of 200 to 500 m$^2$/g. and a pore volume greater than about 2.0 cc/g. a major portion of the pore volume being provided by pores having diameters in the range of 300 to 600 Å.

Such supports are provided with a regulated water content up to 15 to 25 weight percent based upon the support, preferably 0.25 to 6.0 weight percent. The support material may be dried or moisturized, as by equilibrium with the atmosphere, to the selected water level. In general, levels of water much above 3.5% by weight will have little additional effect upon the results achieved at low aluminum levels e.g., 3.7%, and accordingly lower levels are preferred for best system control. Higher water levels may be necessary at higher aluminum levels, e.g. 10%. Optimum results, i.e., increased sensitivity in resin differentiation are secured when water content is regulated within the limit 0.25 to 6.0±0.15% by weight for the preferred silica gel.

The aluminum-containing compound employed herein is reactive with water i.e., it undergoes a controlled hydrolysis ranging through stages of partial hydrolysis (depending upon levels of available moisture in the system relative to aluminum compound charged) correlatable with selective aluminum species, and admixtures thereof. The aluminum compounds are also reactive with the surface hydroxyl groups of the inorganic support material, as are the reaction products with water.

The FIGURE is a graph showing the relationship between aluminum concentration and water concentration.

Preferred aluminum compounds may be presented by the formula:

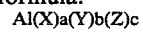

Al(X)a(Y)b(Z)c wherein X is R, Y is OR, and Z is H or a halogen; a is 0–3, b is 0–3, c is 0–3, and a+b+c equals 3; and R is an alkyl or aryl group having from one to eight carbon atoms.

Examples of such aluminum comounds include aluminum alkoxides such as aluminum sec-butoxide, aluminum ethoxide, aluminum isopropoxide; alkyl aluminum alkoxides such as ethyl aluminum ethoxide, methyl aluminum propoxide, diethyl aluminum ethoxide, diisobutyl aluminum ethoxide, etc.; alkyl aluminum compounds such as triethyl aluminum; triisobutyl aluminum, etc.; alkyl or aryl aluminum halides such as diethyl aluminum chloride; aryl aluminum compounds such as triphenyl aluminum, aryloxy aluminum compounds such as aluminum phenoxide and mixed aryl, alkyl and aryloxy, alkyl aluminum compounds.

For the preparation of the preferred polymerization catalysts, the support is treated with a chromium-containing compound, before heat activation.

The chromium containing compounds useful in the present invention comprise any chromium containing compound capable of reacting with the surface hydroxyl groups of an inorganic support. Examples of such compounds include chromium trioxide, chromate esters such as the hindered di-tertiary polyalicyclic chromate esters, silyl chromate esters and phosphorus containing chromate esters disclosed in U.S. Pat. Nos. 3,642,749; and 3,704,287, and organophosphoryl chromium compounds such as those disclosed in U.S. Pat. No. 3,985,676 (incorporated herein by reference) which comprises the reaction product of chromium trioxide with an organophosphorus compound having the formula:

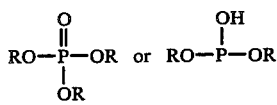

wherein R is alkyl, aralkyl, aryl, cycloalkyl or hydrogen, but at least one R is other than hydrogen. The preferred organophosphorus compounds are trialkyl phosphates such as triethyl phosphate.

The novel catalyst of the present invention may be prepared by depositing the chromium containing compound and the aluminum compound on the inorganic support in any suitable manner such as by vapor coating or by impregnating the support with solutions of the chromium containing compound and the aluminum compound in a suitable inert solvent which is normally an anhydrous organic solvent. Such organic solvents include aliphatic, cycloalkyl, and alkylaryl hydrocarbons and their halogenated derivatives. A preferred organic solvent is dichloromethane. The chromium and aluminum compounds may be applied together or individually. In applicants' usual method of catalyst preparation, the support is impregnated first with the chromium containing compound and then the aluminum compound. Most preferred for optimum reporducibility is anhydrous organic solvent application by impregnation, employing about 1 to 2 pore volumes of a solvent such as methylene chloride.

When an organophosphoryl chromium compound of the type disclosed in the aforesaid U.S. Pat. No. 3,985,676 is utilized in the practice of the present invention, it is preferred to employ the particular catalyst preparation techniques described in that patent, the disclosure of which is incorporated by reference herein. In such instance the organoaluminum compound may be applied to the catalyst support under conditions similar to those utilized for deposition of the organophosphoryl chromium compound.

The most effective catalysts have been found to be those containing the chromium compound in an amount such that the amount of Cr by weight based on the weight of the support is from about 0.25 to 2.5% and preferably is from about 0.5 to 1.25%, although amounts outside of these ranges still yield operable catalysts. The aluminum compound should be added in sufficient amounts to provide from about 0.1 to 10% of aluminum by weight based on the weight of the support and preferably from about 0.5 to 5.5% although other amounts outside of these ranges can be used to prepare operable catalysts.

After the chromium containing compound and the aluminum compound have been deposited on the inorganic support, the support is heated in a non-reducing atmosphere, preferably in an oxygen containing atmosphere, at a temperature above about 200° F. up to the decomposition temperature of the support. Typically, the supported compositions are heated at a temperature of from 800° F. to 2000° F. The heating time may vary, for example, depending on the temperature used, from ½ hour or less to 50 hours or more. Normally the heating is carried out over a period of 2 to 12 hours. The non-reducing atmosphere which is preferably air or other oxygen containing gas should be dry and preferably should be dehumidified down to a few parts per million (ppm) of water to obtain maximum catalyst activity. Typically, air used in the procedure described in this application is dried to less than 2-3 ppm of water.

Although anhydrous solvents in the deposition procedure, and dehumidified air in drying or heat activation are normally employed, in practice control of moisture on the support is found sufficient to achieve the objects of the invention. It is of course also possible at constant support water level to adjust by moisture present in the solvent treatment systems. Time of reaction or interaction of the aluminum compounds does not appear to be critical, and deposition is normally effected under ambient conditions, as in a conventional blender-coater apparatus.

In accordance with the disclosure of copending and commonly assigned U.S. Pat. No. 4,100,104 and incorporated herein by reference, the catalyst may be prepared by separately activating the catalyst after the addition of each separate component.

The absolute level of aluminum compound and the ratio of water to aluminum compound is considered important to the controlled polymerization of the present invention. In general, the proportion of aluminum compound may range from about 0.1 to 10% by weight, based on the support, preferably from 0.35 to 5.5% and will, at constant moisture level in the preparation, evidence in use decreasing molecular weight with aluminum level and increasing molecular weight distribution as measured by melt index values on resin produced. The water to aluminum molar ratio may vary from an essentially anhydrous system to about 4.0, preferably 0.5 to 2.0, with lower values correlating with lower molecular weight and intermediate shear response, or molecular weight distribution.

Proportions of water and aluminum compound have been expressed herein in terms of weight percent based upon the aluminum-containing support, and molar ratio of water on aluminum-containing support to aluminum. While these values may be readily calculated, for ease of conversion, reference may be had to the accompanying FIGURE.

Control of these respective variables under otherwise equivalent operating conditions accordingly offers responsive selection of resin characteristics. However, as noted hereinabove, the differentiation of resin characteristics, although critical to fabricators, may be ascertainable only through the use of specialized melt viscometry measurements. Certain fabrication equipment such as accumulator ram blow molding equipment is responsive to melt rheology correlatable with higher shear rates and different shear rate response than may be determined utilizing conventional melt index measurements.

Accordingly, for the purpose of this invention melt viscosity is measured directly as 'Eta', at shear rates of 1 and 1000 reciprocal seconds, and shear response is expressed as the viscosity ratio $Eta_1/Eta_{1000}$. This measurement provides a reliable tool for correlating reproducibly resin rheology with fabrication requirements. Lower water to aluminum ratios evidence lower Eta values (lower molecular weight) and intermediate viscosity ratios (broadest shear response, or molecular weight distribution is evident at an intermediate water to aluminum ratio); and lower absolute aluminum levels evidence increased Eta values, and lower viscosity ratios at constant water to aluminum ratios.

Specific resins may accordingly be tailored for use, e.g., in respect of shear level and response by control of water to aluminum ratios and aluminum coating levels.

Best results have been achieved with organophosphoryl chromium reaction product on Polypor silica gel for accumulator ram blow molding equipment at an absolute aluminum level of 0.5% and a water to aluminum molar ratio of 0.5, the resins so produced under standard conditions (1 ppm TEB, about 1 wgt.% Cr and $H_2$ 0.3–0.7 mol%) evidencing a viscosity ratio of about 37 to 43. Obviously, the shape of the molecular weight distribution curve and therefore shear response at a given average molecular weight may be controlled by the artisan in accordance with the invention.

The heat-treated support chromium and aluminum compounds of the present invention may be used in combination with metallic and/or non-metallic reducing agents to provide novel catalyst systems for the polymerization of olefins. Examples of metallic reducing agents include trialkyl aluminums, such as triethyl aluminum, triisobutyl aluminum, alkyl aluminum halides, alkyl aluminum alkoxides, dialkyl zinc, dialkyl magnesium, and metal borohydrides including those of the alkali metals, especially sodium, lithium and potassium, and of magnesium, beryllium and aluminum. The non-metal reducing agents include alkyl boranes such as triethyl borane, triisobutyl borane, and trimethyl borane and hydrides of boron such as diborane, pentaborane, hexaborane and decaborane. For example, based upon a catalyst composition containing about 1% by weight of Cr based upon the weight of the support, the preferred amount of an organometallic reducing agent for use therewith, e.g., triisobutyl aluminum (TIBAL), is about 11.4% by weight and equivalent to an Al/Cr atomic ratio of about 3/1. The preferred range of atomic ratios of Al to Cr is from about 0.5/1 to 8/1, or from about 1.9% to about 30% by weight TIBAL. The overall practicable limits of TIBAL in terms of the Al/Cr atomic ratio are from about 0.1/1 to 20/1, and in terms of weight are from about 0.4% to about 75% by weight.

The heat-treated, supported chromium containing compound and aluminum compound may be combined with the metallic or non-metallic reducing agent prior to being fed to an olefin polymerization reactor or these two components may be fed separately to an olefin polymerization reactor.

In proportioning the amount of metallic or non-metallic reducing agent to the amount of chromium compound used in the catalyst systems of the present invention, fairly wide latitude is available, but some guidelines have been established consistent with good yield, favorable polymer properties and economic use of materials. For example, in the use of metallic and/or non-metallic reducing agents with an amount of chromium compound sufficient to yield about 1% Cr by weight of the support the parameters set forth below are representative. The atomic ratios are based upon a calculation of the metal in the metallic reducing agent and/or the non-metal in the non-metallic reducing agent versus the chromium content prevent in the chromium compound on the support.

Another example of an organometallic reducing agent for use in conjunction with the catalyst composition of the present invention is triethyl aluminum. Again based upon a catalyst composition containing about 1% by weight of Cr based upon the weight of the support, the preferred amount of triethyl aluminum (TEA) is about 6.6% by weight based upon the weight of the support giving an Al/Cr atomic ratio of about 3/1. The preferred range of atomic ratios of Al to Cr is from about 0.5/1 to 8/1, or from about 1.1% to about 18% by weight of TEA. The overall practicable limits of TEA, in terms of an Al/Cr ratio, are from about 0.1/1 to 20/1, and in terms of weight are from about 0.22% to about 44% by weight.

Triethyl boron (TEB) may be taken as the preferred example of the proportions of non-metallic reducing agent for use in conjunction with the catalyst composition of the present invention. Again based upon a catalyst composition containing about 1% by weight of Cr based upon the weight of the support, the preferred amount of TEB is about 5% by weight based upon the weight of the support giving a B/Cr atomic ratio of about 2.7/1. The preferred range of atomic ratios of B to Cr is from about 0.1/1 to 10/1, or from about 0.19 to about 19% TEB. The overall practicable limits, in terms of a B/Cr ratio, are from about 0.01/1 to about 20/1, and in terms of weight, are from about 0.02% to about 38% by weight based upon the weight of the support.

As indicated above, the preferred catalyst compositions of this invention are employed in conventional polymerization processes for olefins, in particular 1-olefins having 2–8 carbon atoms such as ethylene, propylene, 1-butene, 3-methylbutene-1, 4-methyl pentene-1 alone or in admixture, and copolymerization thereof with ethylenically unsaturated monomers such as vinyl acetate, acrylonitrile, or methyl methacrylate with or without modifiers, chain transfer or termination agents and the like, as known in the art. Such polymerizations may be effected under temperature and pressure conditions generally employed in the art e.g., temperatures of from about 40° to about 200° C. and preferably from about 70° to 110° C., and pressures of from 200 to 1000 psig and preferably from 300 to 800 psig, as are used in slurry or particle form polymerizations.

The catalyst of the invention appears to act uniquely in the polymerization of 1-olefins, especially where hydrogen is employed in the polymerization zone, in that the relation of molecular weight and molecular weight distribution responsive to hydrogen demand is modified, as compared to catalysts in which water level is not controlled. Thus, the excellent hydrogen response evident at low water to aluminum mol ratios permits wider latitude in hydrogen levels while maintaining acceptable productivity. In addition the shape of molecular weight distribution curves can be distinguished, with implications to shear response and die swell properties.

These capabilities translate into resin performance. Heretofore, it had been common practice and a commercial necessity to provide the necessary rheological properties for employment in certain extrusion and forming operations, notably blow molding, by blending together resin products of more than one reactor, as a combination of solution and particle form resins. In accordance with the present invention in a single resin i.e., the product of a 'single reactor' serves to provide the necessary rheological properties directly.

The following examples illustrate preferred modes of carrying out the preparation of the novel catalyst hereof, and of the use of such catalyst for the preparation of polyethylenes of modified and controlled rheological properties. It will be understood that the examples are illustrative only and that various modifications may be made in the specified parameters without departing from the scope of the invention.

The melt viscosities reported are determined with an Instron Capillary Rheometer at 190° C. and at shear rates of 1 to 1000 reciprocal seconds. The Viscosity Ratio expressed is the ratio of $Eta/Eta_{1000}$, referring to the 1 and 1000 reciprocal second values, respectively. Absolute values are reported as poise.

Melt indices where recorded, are determined in accordance with ASTM-D-1238, Conditions E(MI) and F(HLMI), HLMI/MI ratios are measured only over a 10X shear rate range.

Water determinations were made in standard manner employing a titration technique in pyridine using Karl Fisher reagent, and are calculated by weight based upon the aluminum-containing support.

The 'single reactor' resin of the invention exhibits a melt index of up to about 0.4, a viscosity ratio of 35 to 45 and melt strength, die swell, and parison extrusion time equivalent to otherwise comparable resin blends, rendering it particularly well adapted for use in forming operations including employment as the sole resin in blow molding utilizing accumulator or accumulator ram equipment, known for its critical acceptance of resin candidates with particular regard for cycle time, and wall distribution, trimming characteristics, top load values and surface properties of fabricated articles.

For blow molding, resin may be prepared having a density of 0.953 to 0.955, a melt index of 0.25 to 0.40, a melt viscosity of 3.65 to $3.85 \times 10^3$ poise at 1000 $sec^{-1}$, a viscosity ratio of 35 to 45, and a die swell at 1000 sec of 170–185%.

The following methods may be used to prepare the catalysts used in the invention referring, for purposes of exemplification only, to certain preferred embodiments:

The inorganic oxide support, represented by silica xerogel having a pore volume of about 2.5 cc/g prepared in accordance with the disclosure in U.S. Pat. No. 3,652,215 is regulated to a selected moisture level as described hereinabove, usually at least 0.25 and 6.0 percent by weight ±0.15% by drying in nitrogen at an elevated temperature under vacuum or moisturing in contact with a humid atmosphere, and thereafter coated with the aluminum and chromium compounds, or other catalytic material.

In the case of spray coating, the aluminum compound represented here by aluminum sec-butoxide, is diluted with one pore volume (relative to silica gel) methylene chloride and sprayed onto the neat or chromium coated support at 90° C. over a period of one hour (during which 3 bed turnovers are accomplished). The coated catalyst is dried at 235° F. for two to six hours at 10–15 in. Hg, vacuum to remove volatiles. In a preferred modification of this procedure, the aluminum compound in slurried with two pore volumes of anhydrous methylene chloride, and the solvent removed by drying as aforesaid.

Vapor coating may be achieved in similar manner by spraying the support, maintained at a temperature of 400° F., with the aluminum compound at 175° F. over a period of 1.5 hours, then raising the temperature for drying, to 500° F. maintained for 1 hour at maximum vacuum.

The gel is regulated moisture level may also be simply slurried in a suitable anhydrous solvent such as methylene chloride with the aluminum compound and the chromium compound, and thereafter dried to remove volatiles. The dried catalyst may be blended with untreated silica gel, silica gel coated with chromium compound or other support material where further adjustment in water to aluminum ratio is desired, especially to calculated levels of water based upon the aluminum-containing support of below 0.4 weight percent.

To heat activate the catalyst, the supported catalyst is fluidized with dry air at 0.20 feet per second superficial lineal velocity while being heated to a temperature of 900° C. and held at this temperature for 6 hours. The activated supported catalyst is recovered as a powder.

The following Example illustrates the results obtained in accordance with U.S. Pat. No. 3,984,351 where moisture level in the dried support is uncontrolled during catalyst preparation.

EXAMPLE I

Silica gel having a pore volume of about 2.5 cc/g prepared in accordance with the disclosure in U.S. Pat. No. 3,652,215 is added to a 2000 ml, three-neck round bottom flask equipped with a stirrer, nitrogen inlet and y-tube with water condenser. A nitrogen atmosphere is maintained during the coating operation. Dichloromethane is then added to the flask containing the silica gel and stirring is commenced to insure uniform wetting of the gel. A dichloromethane solution of the reaction product of $CrO_3$ and triethyl phosphate prepared as described in U.S. Pat. No. 3,985,676, incorporated herein by reference, is then added to the flask in sufficient quantity to provide a dry coated catalyst containing about 1% by weight of Cr. The supernatant liquid is removed by filtration and the coated gel is dried in a rotary evaporator at 60° C. and with 29 inches of Hg vacuum.

Dichloromethane is added to a similar flask as prepared above and while maintaining a nitrogen atmosphere stirring is commenced. To the flask is added the supported chromium composition as prepared above. A solution of dichloromethane and aluminum sec-butoxide is prepared in a pressure equalizing dropping funnel and the funnel attached to the stirred flask. The aluminum sec-butoxide solution is gradually added to the flask at the rate of 10 grams of solution per minute. After the addition of the solution is complete the slurry in the flask is stirred for about 1 hour. The supernatant liquid is removed by filtration and the coated gel is dried in a rotary evaporator at temperatures up to about 60° C. and 29 inches Hg vacuum.

The supported catalyst is placed in a cylindrical container and fluidized with dry air at 0.20 feet per second superficial lineal velocity while being heated to a temperature of 900° C. and held at this temperature for 6 hours. The activated supported catalyst is recovered as a powder.

A series of polymerizations are carried out to illustrate the results from using a varying amount of the aluminum compound in the preparation of the catalyst at a level of 1% Cr, and constant water level in the support, i.e., the catalyst batches for the respective runs are individually prepared by employing portions of silica gel dried to a constant water level but without control of water level during handling in each such preparation. The results are set forth in Table II.

TABLE II

| Al % wt./SiO$_2$[1] | Productivity (gms Polymer/gm cat./hr.) | MI | HLMI |
|---|---|---|---|
| None | 558 | low | 7.0 |
| .1 | 1328 | 0.04 | 9.1 |
| .2 | 717 | 0.05 | 11.4 |
| 1.0 | 780 | 0.36 | 67.5 |
| 2.4 | 926 | 1.10 | 116.5 |
| 3.7 | 886 | 2.68 | 340 |
| 5.5[2] | 616 | 4.90 | 390 |

[1] gms Al per 100 gms SiO$_2$ support
[2] Polymerization temperature 90° C. B/Cr atomic ratio 2.9

Resin produced under the above conditions, while suitable for general application, in many cases requires careful batch selection to match characteristics for use in certain critical applications such as blow molding. Such resin variability has been traced to the small variations in support moisture present when water level is not controlled during handling in individual catalyst preparations. The following Examples show the effect of such moisture variation, and its control.

EXAMPLE II

Supported chromium-containing catalyst (1 weight % Cr) prepared as described in Example I and comprising 1.85% Al as aluminum sec-butoxide (solvent coated with 2 pore volumes of methylene chloride) on silica gel at variant water levels as indicated is utilized in an ethylene polymerization at 1 ppm TEB, at varying hydrogen level to secure target MI resin, with the results set forth in Table III:

TABLE III

| Wet % Water (H$_2$O/Al Molar) | MI | HLMI | HLMI/MI | Viscosity Ratio, Eta$_a$/Eta$_{1000}$ | Hydrogen Response, H$_2$/C$_2$H$_4$ mol ratio | % Die Swell, 1000 sec .1 |
|---|---|---|---|---|---|---|
| 0.5 (0.45) | .20 | 28 | 146 | 55.4 | 0.07 | 172.5 |
| 0.6 (0.50) | .17 | 29 | 151 | 56.1 | 0 | 176 |
| 1.3 (1.1) | .16 | 24 | 142 | 60.6 | 0.033 | 165 |
| 2.5 (2.1) | .21 | 27 | 129 | 53.8 | 0.35 | 162 |

EXAMPLE III

A further polymerization of ethylene is conducted at a temperature of 220° F., a hydrogen level of 0.5–0.8 mol% (ethylene=6–8 mol%) to secure target M.I. of 0.30±0.5, and 1 ppm triethylborane utilizing a heat-activated catalyst composed of organophosphoryl chromium reaction product (1% Cr) on Polypor silica xerogel (manufactured by National Petro Chemicals Corp.) at 0.5 to 0.6 water level, coated (2 pore volumes, methylene chloride) with 1.85 weight percent aluminum as aluminum sec-butoxide, blended at about a 4:1 weight ratio with the same chromium-containing catalyst without added aluminum compound (nominal water level 0.5–0.6 weight percent) to provide a water (calculated on aluminum-containing support) to aluminum molar ratio of 0.5 and an aluminum level (calculated on total support) of 0.5 weight percent.

The resin produced is of about 0.953 density, 0.3 melt index, a melt viscosity of $3.75 \times 10^3$ poise at 1000 sec$^{-1}$ and a viscosity ratio of about 40. The resin exhibits a die swell of 171% at 1000 sec$^{-1}$ and may be run successfully without blending on an accumulator ram blow molding device to produce e.g., a 22 oz. detergent bottle with equivalent parison extrusion and cycle times as compared to blended resins.

EXAMPLE IV

A catalyst is prepared from the reaction product of CrO$_3$ and triethyl phosphate (prepared as set forth in U.S. Pat. No. 3,985,676) deposited at about 1% by weight Cr on silica xerogel having a surface area of about 300 m$^2$/g. and a pore volume of about 2.5 cc/g, containing 7.4% water, coated with 10% by weight aluminum as aluminum sec-butoxide (coatings with 2 pore volume of methylene chloride), dried and heat activated.

Ethylene is polymerized with said catalyst and triethyl boron at 210° C., 30 psi H$_2$, and 3.7 B/Cr ratio to produce a polymer of M.I. 8.2.

What we claim is:

1. A process for the production of polyolefin resins comprising polymerizing at least one 1-olefin at elevated temperature and pressure in a polymerization zone comprising a catalytic amount of a polymerization catalyst for said 1-olefin, said catalyst comprising porous inorganic oxide support coated with an organophosphoryl chromium reaction product and an aluminum compound component and heat activated said aluminum compound component being hydrolyzed by reaction with a controlled amount of water.

2. A process for the production of a polyolefin resin of selected rheology comprising polymerizing at least one 1-olefin in the presence of a supported chromium containing catalyst, said catalyst comprising a silica xerogel having a surface area in the range of 200 to 500 m$^2$/g and a pore volume greater than about 2.0 cc/g a major portion of the pore volume being provided by pores having diameters in the range of 300 to 600 Å, having coated thereon an aluminum compound reactive with water, the water content being regulated within the limit 0.25 to 6.0±0.15 weight percent, and heat activated in a non-reducing atmosphere at a temperature of from 200° F. up to the decomposition temperature of the support.

* * * * *